April 16, 1935. E. J. WALKER 1,998,296
SPRING CLIP
Filed Aug. 2, 1933
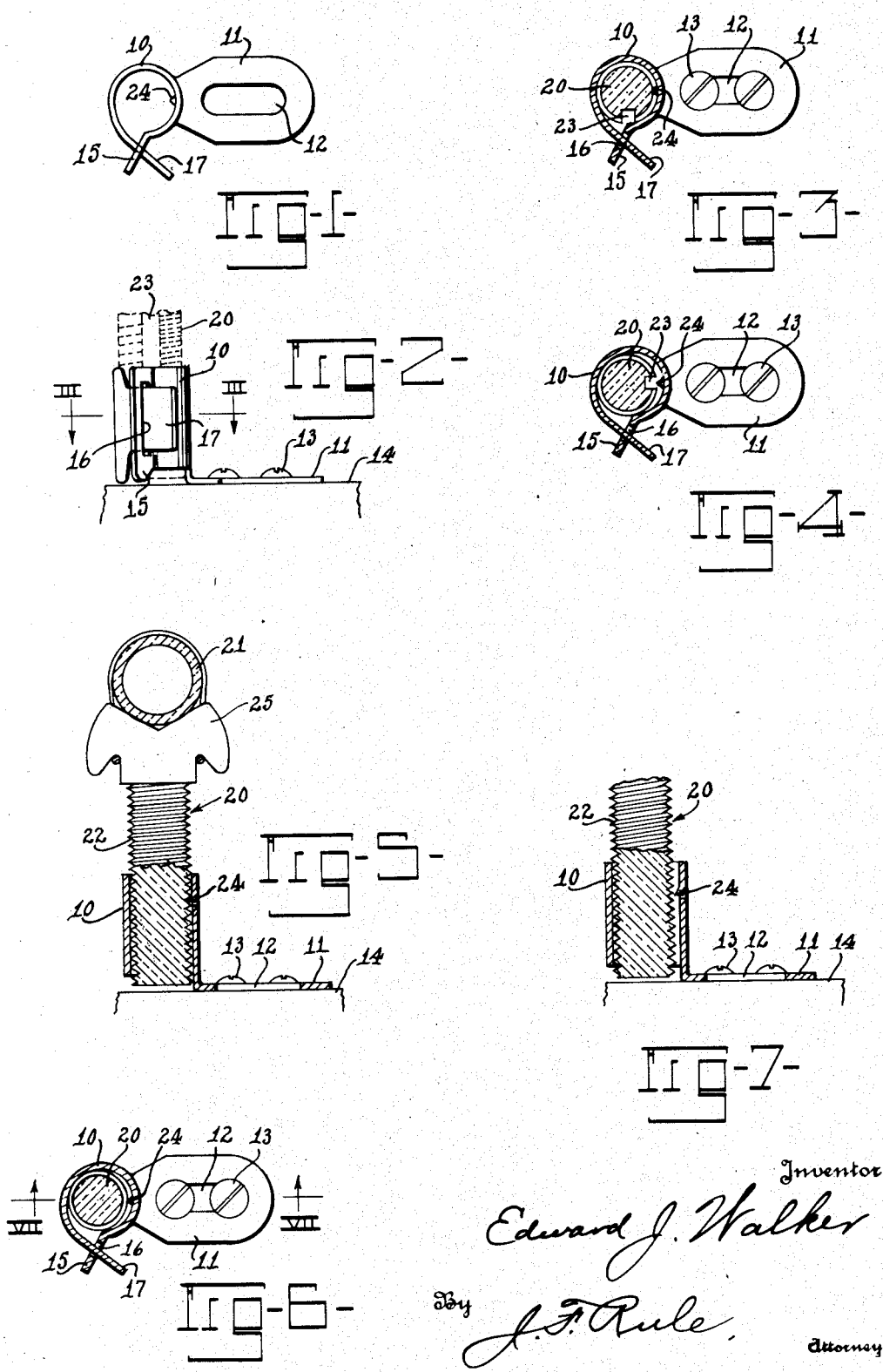
Inventor
Edward J. Walker
By J. F. Rule
Attorney Patented Apr. 16, 1935

1,998,296

UNITED STATES PATENT OFFICE 1,998,296

SPRING CLIP

Edward J. Walker, Toledo, Ohio, assignor to Owens-Illinois Glass Company, a corporation of Ohio Application August 2, 1933, Serial No. 683,260

1 Claim. (Cl. 248—30)

My invention relates to a spring clip or clamping device combined with or adapted for use with a post or other device which is gripped thereby.

An object of the invention is to provide a clamp which may be readily applied to or released from the article which it engages, and which holds such article in any desired position of adjustment relative to the clamp.

Other objects will appear hereinafter.

Referring to the accompanying drawing:

Fig. 1 is a plan view of the clamp.

Fig. 2 is an elevational view showing the clamp and parts connected thereby.

Fig. 3 is a section at the line III—III of Fig. 2.

Fig. 4 is a view similar to Fig. 3 but showing the clamp released from its clamping position.

Fig. 5 is a part sectional elevation showing the clamp, an insulating post and connected parts.

Fig. 6 is a sectional plan view of the same, but showing the clamp released from gripping engagement with the post.

Fig. 7 is a section at the line VII—VII on Fig. 6.

The clip or clamping device is preferably made in a single piece from resilient sheet metal, and comprises a body 10 and a base 11 bent outwardly at right angles to the body. The base is formed with an opening 12 to receive screws 13 by which the clip is attached to a support 14. The body 10 is formed of a strip of metal bent or curved into substantially the form of a cylinder. Said strip is of greater length than is required to form the cylindrical body, and the end portions 15 and 17 thereof extend outwardly beyond said body. The end portion 15 which, as shown, is flat, extends laterally outward from the cylinder at an angle and it is provided with a slot 16 through which extends the end portion 17, the latter extending tangentially from the cylindrical body portion. The parts 15 and 17 provide finger pieces which when compressed between the thumb and finger, expand the cylindrical body so that it may be slipped lengthwise along a post 20 or other device to which the clamp is to be applied.

As herein shown, the post 20 is a glass insulator post designed to hold a neon tube 21. The stem of the post is provided with screw threads 22 and is formed with a slot 23 extending lengthwise thereof. The body 10 of the clip before it is expanded is of somewhat smaller diameter than the diameter of the stem to which it is attached. By grasping the finger pieces 15 and 17 the clip may be expanded so that the stem of the post can be readily inserted. When the finger pieces are released the clip springs into gripping engagement with the post. The clip is preferably formed with a tooth 24 which projects inwardly to engage between the threads on the post and thereby securely hold the latter against endwise movement within the clip.

In order to facilitate the positioning of the post in the clip and its removal therefrom, the stem of the post is formed with the longitudinal slot 23. In placing the post into position, the slot is brought into line with the tooth 24, permitting the post to be moved lengthwise to the desired position without interference between said tooth and the screw threads. When the post has been inserted within the clip as far as desired, it is rotated to move the groove 23 out of alignment with the tooth 24, so that when the finger pieces are released the tooth will enter between the adjoining screw threads and thereby positively hold the post against endwise movement relative to the clip. The groove 23 is so positioned relative to the head 25 of the post that when the parts are assembled as shown in Fig. 5, the groove 23 is out of register with the tooth 24.

If desired, the groove 23 may be omitted, as the resiliency of the clip permits it to be expanded as shown in Figs. 6 and 7, so that the locking tooth 24 is released from the screw threads.

Modifications may be resorted to within the spirit and scope of my invention.

What I claim is:

A spring clamping device for supporting an insulator post, said device formed of resilient sheet material and comprising a body portion bent into approximately cylindrical form and normally contracted to a diameter less than that of the post, said body portion having end portions extending laterally outward from the body, one of said end portions being slotted and the other end portion extending through the slot, said end portions forming finger pieces adapted to be moved relative to each other in substantially opposite directions in expanding said body, and a base extending outwardly from one end of said body at right angles thereto, said body and base being formed of a single piece.

EDWARD J. WALKER.